United States Patent
Mani et al.

(10) Patent No.: US 11,570,115 B2
(45) Date of Patent: Jan. 31, 2023

(54) BANDWIDTH MANAGEMENT

(71) Applicant: Imagination Technologies Limited, Kings Langley (GB)

(72) Inventors: Senthil Kumar Mani, Hyderabad (IN); Bala Manikya Prasad Puram, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 1582 days.

(21) Appl. No.: 15/249,653

(22) Filed: Aug. 29, 2016

(65) Prior Publication Data
US 2017/0063703 A1 Mar. 2, 2017

(30) Foreign Application Priority Data
Aug. 28, 2015 (GB) .................................... 1515348

(51) Int. Cl.
*H04L 12/825* (2013.01)
*H04L 12/24* (2006.01)
*H04L 47/25* (2022.01)
*H04L 41/0896* (2022.01)

(52) U.S. Cl.
CPC .......... *H04L 47/25* (2013.01); *H04L 41/0896* (2013.01)

(58) Field of Classification Search
CPC ................. H04L 47/25; H04L 41/0896; H04L 2012/5681; H04L 49/9005; H04L 1/1838; H04L 1/1877; H04I 1/1877; H04N 19/152; H04N 21/2401
See application file for complete search history.

(56) References Cited

U.S. PATENT DOCUMENTS 7,180,858 B1 * 2/2007 Roy ..................... H04L 43/0888
370/229
7,545,745 B1 6/2009 Cherchali et al.
7,571,246 B2 * 8/2009 Virdi ................ H04N 21/23611
709/232

(Continued)

FOREIGN PATENT DOCUMENTS

KR 20110034895 A 4/2011

OTHER PUBLICATIONS

Ribeiro et al. "pathchirp: Efficient available bandwidth estimation for network paths", 2003.

(Continued)

*Primary Examiner* — Huy D Vu
*Assistant Examiner* — Bailor C Hsu
(74) *Attorney, Agent, or Firm* — Potomac Law Group, PLLC; Vincent M DeLuca

(57) ABSTRACT

A method of estimating available bandwidth for a network comprising a transmitting device and a receiving device, the method comprising: transmitting a media packet stream over the network to the receiving device, the media packets comprising media data for streaming media at the receiving device; transmitting one or more probe packets over the network so as to test the available bandwidth of the network, wherein the probe packets comprise duplicate data of the media packet stream; and determining, during transmission of the probe packets, a measure of network bandwidth availability in dependence on one or more metrics associated with receiving the media packet stream at the receiving device.

15 Claims, 4 Drawing Sheets

(56) References Cited

U.S. PATENT DOCUMENTS

| | | | | |
|---|---|---|---|---|
| 7,720,983 B2* | 5/2010 | Klemets | ............ | H04L 29/06027 370/231 |
| 7,860,038 B2* | 12/2010 | Abhishek | .............. | H04W 8/005 370/311 |
| 8,050,289 B1* | 11/2011 | Masterson | ......... | H04N 21/4402 370/465 |
| 8,165,090 B2* | 4/2012 | Nix | ....................... | H04L 29/125 370/331 |
| 8,505,054 B1* | 8/2013 | Kirley | ................ | H04N 21/436 725/74 |
| 8,831,760 B2* | 9/2014 | Gupta | .................... | G10L 25/00 700/94 |
| 9,237,108 B2* | 1/2016 | Sun | ....................... | H04L 47/283 |
| 9,363,691 B1* | 6/2016 | Shipley | ................ | H04W 24/04 |
| 2002/0016937 A1* | 2/2002 | Houh | ....................... | H04L 43/50 714/43 |
| 2005/0097217 A1 | 5/2005 | Val et al. | | |
| 2006/0088063 A1* | 4/2006 | Hartung | ........... | H04N 21/64707 370/395.2 |
| 2006/0146723 A1* | 7/2006 | Navada | ................... | H04L 43/50 370/251 |
| 2007/0038701 A1* | 2/2007 | Majors | .............. | H04L 29/06027 709/204 |
| 2007/0268887 A1* | 11/2007 | Schwartz | ............. | H04J 3/0632 370/352 |
| 2008/0151915 A1* | 6/2008 | Masuya | ................ | H04J 3/0632 370/401 |
| 2009/0089842 A1* | 4/2009 | Perry | .................. | H04W 72/005 725/78 |
| 2009/0164657 A1* | 6/2009 | Li | ....................... | H04L 41/0896 709/233 |
| 2010/0208613 A1* | 8/2010 | Oba | .................... | H04L 43/0882 370/253 |
| 2010/0333148 A1* | 12/2010 | Musha | ............. | H04N 21/23406 725/81 |
| 2011/0142034 A1 | 6/2011 | Wu et al. | | |
| 2012/0163221 A1 | 6/2012 | Miyazawa | | |
| 2012/0314761 A1* | 12/2012 | Melnyk | ................. | H04L 65/605 375/240.02 |
| 2013/0058248 A1* | 3/2013 | Singh | .................. | H04L 43/0876 370/252 |
| 2013/0159495 A1 | 6/2013 | Wang et al. | | |
| 2015/0334030 A1* | 11/2015 | Vasseur | ................ | H04L 47/115 370/230 |
| 2017/0034545 A1* | 2/2017 | Rozenberg | ......... | H04N 21/2402 |
| 2020/0396464 A1* | 12/2020 | Shah | .................... | H04N 19/115 |
| 2021/0399971 A1* | 12/2021 | Shiang | ............... | H04N 21/2402 |

OTHER PUBLICATIONS

Bolot "End-to-end packet delay and loss behavior in the internet" In Conference Proceedings on Communications Architectures, Protocols and Applications, SIGCOMM '93, pp. 289-298, New York, NY, USA, 1993. ACM.

Song et al. "A control theoretical approach for flow control to mitigate bandwidth attacks" In Information Assurance Workshop, 2006 IEEE, pp. 348-360, Jun. 2006.

Jain et al. "End-to-end available bandwidth: Measurement methodology, dynamics, and relation with tcp throughput" IEEE/ACM Trans. Netw., 11(4):537-549, Aug. 2003.

Wenger et al. "Rtp payload format for h.264 video" RFC 3984 (Proposed Standard), Feb. 2005 Obsoleted by RFC 6184.

Valin et al. "Definition of the opus audio codec" RFC 6716 (Proposed Standard), Sep. 2012.

Chandrasekhar et al. "Bandwidth-efficient voice activity detector" In Information and Communication Technology in Electrical Sciences (ICTES 2007), 2007. ICTES. IET-UK International Conference on, pp. 533-538, Dec. 2007.

Schulzrinne et al. "Rtp: A transport protocol for real-time applications" RFC 3550 (Internet Standard), Jul. 2003. Updated by RFCs 5506, 5761, 6051, 6222, 7022, 7160, 7164.

Carson et al. "Nist net: A linux-based network emulation tool" SIGCOMM Comput. Commun. Rev., 33(3):111-126, Jul. 2003.

* cited by examiner

BANDWIDTH MANAGEMENT

BACKGROUND OF THE INVENTION

This invention relates to devices and methods for managing the transmission of a media stream in changeable network conditions.

Real-time streaming of multimedia content over the internet has become an increasingly common application in recent years. A wide range of multimedia applications, such as on-demand TV, live TV viewing, video conferencing, net meetings, video telephony, voice over internet protocol (VoIP) and many others rely on end-to-end streaming solutions. Unlike a "downloaded" media file, which may be retrieved first in "non real-time" and viewed or played back later, streaming media applications require a media source to encode and to transmit a media signal over a network to a media receiver, which must decode and play the media signal in real time.

Voice and Video over IP (VVoIP) calls, in particular, require VVoIP packets to be received and decoded in a timely manner so that the speech and video can be played back with minimal delay. However, poor bandwidth availability can lead to the late arrival of VVoIP packets, which causes an undesirable delay or loss in the playback of the speech and video. In such conditions, the quality of the voice and video media may be reduced so that the VVoIP call uses less network bandwidth, which may help packets traverse the network more rapidly.

The network bandwidth available may vary depending on the route between the two callers. For example, if the VVoIP call is being carried out on a mobile device connected to a mobile network, the available bandwidth will vary depending on the mobile network coverage, the number of users in a mobile cell, distance from a base station, etc. Similarly, a device connected to a WiFi network may also experience variable bandwidth availability due to the number of users connected to the access point, WiFi signal strength, etc. Some devices may also switch their network connections between a mobile network and WiFi. Thus, the bandwidth available for the VVoIP call can vary.

A decrease in the available bandwidth may cause the quality of the VVoIP call to degrade. The bandwidth may decrease during a VVoIP, which may cause the VVoIP packets to queue up at some point in the network. As mentioned above, this may lead to a delay in those packets being received by the recipient and thus cause an undesirable delay in the playout of the audio and video media in those packets. A large build-up of packets in the network may eventually lead to the call being dropped. Thus it is desirable to adapt the transmission properties (such as the bitrate) of the VVoIP call so that the call can be maintained when there is a decrease in the available bandwidth.

When there is an increase in the available bandwidth, it is desirable to adapt the transmission properties of the VVoIP call so that the call is carried out with the best audio and video quality possible to enhance the call experience for the users.

One method of estimating the available bandwidth of a network is to send probe packets into the network and measure the delay in receiving those packets at a receiving device. Ribeiro et al, "pathChirp: Efficient Available Bandwidth Estimation for Network Paths" (2003), details one such probing method. A problem with such conventional probing methods is that the network bandwidth is detected by degrading the network. The probe packets themselves utilise network bandwidth and thus the probing may degrade the quality of the VVoIP call, especially when the available network bandwidth is already somewhat limited.

There is, therefore, a need for a more efficient method of estimating the available bandwidth of a network and to efficiently adapt the transmission properties of a VVoIP stream (or any other type of media stream) to provide a stream with best quality possible.

BRIEF SUMMARY OF THE INVENTION

According to a first aspect of the disclosure there is provided a method of transmitting a video packet stream from a transmitting device to a receiving device over a network, the method comprising: transmitting an audio packet stream to the receiving device; determining a measure of network bandwidth in dependence on one or more metrics associated with receiving the audio packet stream at the receiving device; and enabling a video packet stream in dependence on the determined measure.

The method may further comprise adapting a transmission bitrate of the video packet stream in dependence on the determined measure.

The method may further comprise: if the measure indicates sufficient available network bandwidth, increasing the transmission bitrate of the audio packet stream; and re-determining said measure subsequent to the increasing the bitrate of the audio stream and performing said enabling if the measure indicates sufficient available network bandwidth.

The method may further comprise: re-determining said measure and if the re-determined measure indicates that the transmission bitrate of the audio and video streams are greater than the network bandwidth, decreasing the transmission bitrate of the video stream only.

The method may further comprise determining an overload bandwidth in dependence on the measure and decreasing the transmission bitrate of the video stream by the overload bandwidth.

The method may further comprise determining a difference between the network bandwidth and the transmission bitrate of the audio and video streams, wherein the transmission bitrate of the video stream is decreased by said difference.

The method may further comprise re-determining said measure and if the re-determined measure indicates that the transmission bitrate of the audio and video streams is greater than the network bandwidth, disabling the transmission of the video stream only.

The one or more metrics may comprise a measure of network delay, the delay comprising a first time taken for a first audio packet to be received at the receiving device from the transmitting device.

The delay may further comprise a second time taken for a second audio packet to be received at the transmitting device from the receiving device.

The method may further comprise, at the receiving device: receiving the audio packet stream from the transmitting device; determining one or more metrics associated with receiving the audio packet stream; and transmitting the determined metrics to the transmitting device.

The method may further comprise transmitting one or more probe packets for testing the available bandwidth of the network, wherein the probe packets comprise data duplicated from the audio packet stream.

The method may further comprise the step of classifying the network into a good, bad or normal state in dependence on the determined measure.

The method may further comprise: increasing the transmission bitrate of, or enabling, the video packet stream if the network state is classified as good, or decreasing the transmission bitrate of, or disabling, the video packet stream if the network state is classified as bad.

The method may further comprise the steps of: prior to the step of enabling the video packet stream and if the network is classified as good, increasing a rate of increase for the transmission bitrate of the audio packet stream; and increasing the transmission bitrate of the audio packet stream at said increased rate.

According to a second aspect of the disclosure there is provided a method of estimating available bandwidth for a network comprising a transmitting device and a receiving device, the method comprising: transmitting a media packet stream over the network to the receiving device, the media packets comprising media data for streaming media at the receiving device; transmitting one or more probe packets over the network so as to test the available bandwidth of the network, wherein the probe packets comprise duplicate data of the media packet stream; and determining, during transmission of the probe packets, a measure of network bandwidth availability in dependence on one or more metrics associated with receiving the media packet stream at the receiving device.

The probe packets may be duplicates of packets from the media packet stream.

The method may further comprise, if the measure indicates a reduction in the available bandwidth sufficient to degrade the quality of the media stream, stopping the transmission of the probe packets.

The method may further comprise, if the measure indicates sufficient available bandwidth, increasing a transmission bitrate for the media stream.

The said increase of the transmission bitrate may comprise enabling a video stream.

The probe packets may be transmitted at regular time intervals, wherein, if the measure indicates a reduction in the bandwidth of the network sufficient to degrade the quality of the media stream, increasing the amount of time between the time intervals.

According to a second aspect of the disclosure there is provided a transmitting device for transmitting a video packet stream to a receiving device over a network, the transmitting device comprising: a transceiver configured to transmit an audio packet stream to the receiving device; a bandwidth estimator configured to determine a measure of network bandwidth in dependence on one or more metrics associated with receiving the audio packet stream at the receiving device; and a controller configured to enable a transmission of a video packet stream in dependence on the determined measure.

The controller may be further configured to adapt a transmission bitrate of the video packet stream in dependence on the determined measure.

The controller may be configured to increase the transmission bitrate of the audio packet stream if the measure indicates sufficient available network bandwidth; and the bandwidth estimator is configured to re-determine said measure subsequent to the increasing the bitrate of the audio stream and enable the video packet stream if the measure indicates sufficient available network bandwidth.

The bandwidth estimator may be configured to re-determine said measure; and the controller may be configured to decrease the transmission bitrate of the video stream only if the re-determined measure indicates that the transmission bitrate of the audio and video streams are greater than the network bandwidth.

The controller may be configured to: determine a difference between the network bandwidth and the transmission bitrate of the audio and video streams; and decrease the transmission bitrate of the video stream by said difference.

The controller may be configured to: determine an overload bandwidth in dependence on the measure; and decrease the transmission bitrate of the video stream by the overload bandwidth.

The bandwidth estimator may be configured to re-determine said measure; and the controller may be configured to disable the transmission of the video stream only if the re-determined measure indicates that the transmission bitrate of the audio and video streams is greater than the network bandwidth.

The one or more metrics may comprise a measure of network delay, the delay comprising a first time taken for a first audio packet to be received at the receiving device from the transmitting device.

The delay may further comprise a second time taken for a second audio packet to be received at the transmitting device from the receiving device.

The transceiver may be further configured to receive the metrics from the receiving device.

The transceiver may be further configured to transmit one or more probe packets for testing the available bandwidth of the network, wherein the probe packets comprise data duplicated from the audio packet stream.

The controller may be further configured to classify the network into a good, bad or normal state in dependence on the determined measure.

The controller may be further configured to: increase the transmission bitrate of, or enable, the video packet stream if the network state is classified as good, or decrease the transmission bitrate of, or disable, the video packet stream if the network state is classified as bad.

The controller may be further configured to: prior to enabling the video packet stream and if the network is classified as good, increase a rate of increase for the transmission bitrate of the audio packet stream; and increase the transmission bitrate of the audio packet stream at said increased rate.

According to a fourth aspect of the disclosure there is provided a transmitting device for estimating available bandwidth for a network comprising the transmitting device and a receiving device, the device comprising: a transceiver configured to transmit a media packet stream over the network to the receiving device, the media packets comprising media data for streaming media at the receiving device; a controller configured to cause the transceiver to transmit one or more probe packets over the network so as to test the available bandwidth of the network, wherein the probe packets comprise duplicate data of the media packet stream; and a bandwidth estimator configured to determine, during transmission of the probe packets, a measure of network bandwidth availability in dependence on one or more metrics associated with receiving the media packet stream at the receiving device.

The probe packets may be duplicates of packets from the media packet stream.

The controller may be configured to stop the transmission of the probe packets if during transmission of the probe packets the measure indicates a reduction in the available bandwidth sufficient to degrade the quality of the media stream.

The controller may be configured to increase a transmission bitrate for the media stream if during transmission of the probe packets the measure indicates sufficient available bandwidth.

The said increase of the transmission bitrate may comprise enabling a video stream.

The probe packets may be transmitted at regular time intervals and the controller may be configured to increase the amount of time between the time intervals if during transmission of the probe packets the measure indicates a reduction in the bandwidth of the network sufficient to degrade the quality of the media stream.

According to a fifth aspect of the disclosure there is provided computer program code defining the above described device, whereby the device can be manufactured.

According to a sixth aspect of the disclosure there is provided a non-transitory computer readable storage medium having stored thereon computer readable instructions that, when processed at a computer system for generating a manifestation of an integrated circuit, cause the computer system to generate a manifestation of the above described device.

According to a seventh aspect of the disclosure there is provided computer program code for performing the above described method.

According to an eighth aspect of the disclosure there is provided a non-transitory computer readable storage medium having stored thereon computer readable instructions that, when executed at a computer system, cause the computer system to perform the above described method.

BRIEF DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
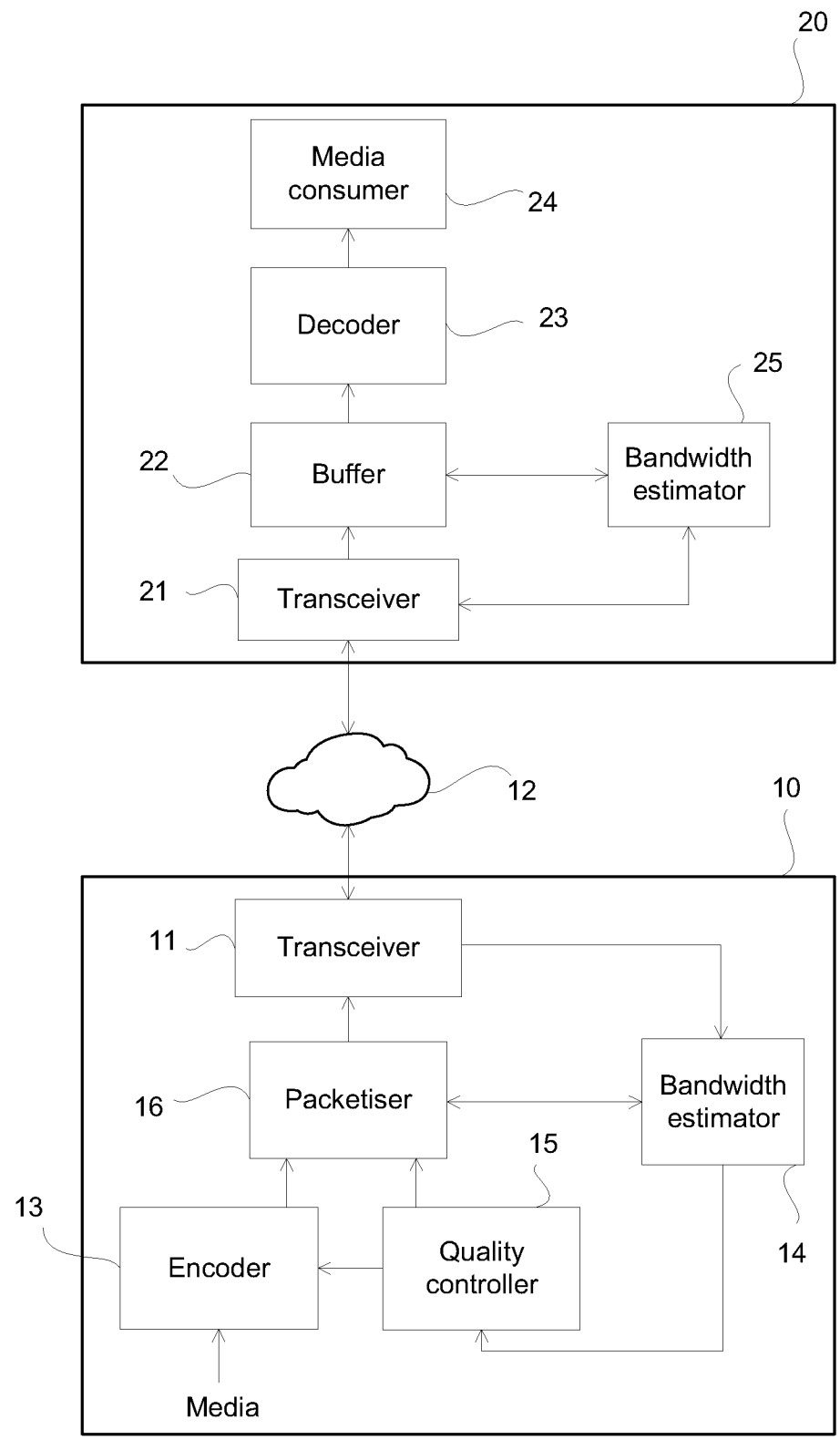
FIG. 1 shows an example of a transmitting device and a receiving device.

FIG. 1 depicts a transmitting device 10, which may be any suitable device that is capable of generating packet based data, such as a computer, smartphone, IP-phone, etc. The transmitting device 10 comprises a transceiver 11 for connection to a communications network 12 such as the internet or other packet based networks. The transmitting device 10 may transmit and/or receive data packets to and/or from the communications network 12 via the transceiver 11. The transmitting device 10 comprises an encoder 13 for encoding media that is to be transmitted over the communications network 12 to a receiving device 20. For example, the encoder 13 may encode audio data according to the OPUS WB codec and video data according to the h.264 codec. Other audio and video codecs may be used. The encoded media may be packetised at a packetiser 16. The media may be packetised according to, for example, the Real-time Transport Protocol (RTP) standard. Other packet formats may be used. The packetised media may then be provided to the transceiver 11 for transmission over network 12 to a receiving device 20.

The receiving device 20 comprises a transceiver 21 for receiving packets from the network 12. The packets are provided to a buffer 22, which may be a jitter buffer that is capable of ordering the packets according to a playout sequence of the media data in the packets. This sequence may be indicated by a sequence number or timestamp contained in each packet. A decoder 23 decodes the packets in the order provided to it by the buffer 22 to form a media stream. The decoder 23 decodes packets according to the codec used by the encoder 13. A media consumer 24 receives the decoded media stream for playback.

The transmitting device 10 comprises a bandwidth estimator 14 for estimating the available bandwidth of the network 12. The estimated bandwidth may be for a path from the transmitting device 10 to the receiving device 20, a path from the receiving device 20 to the transmitting device 10 or both paths. A quality controller 15 may adapt parameters for the media stream in dependence on the estimated bandwidth of network 12. For example, based on bandwidth estimate from the bandwidth estimator 14, the quality controller 15 may adapt parameters (e.g. codec, codec mode, pixel resolution, frame rate, audio bitrate, etc) for encoding media at the encoder 13. In another example, the parameters (e.g. packet size, packet structure, etc) for packetising the encoded media at the packetiser 16 may also be adapted. The encoder 13 and packetiser 16 parameters can be changed to cause the transmission bitrate of the media stream to be changed. Thus the transmission bitrate of the media stream can be controlled by selecting appropriate parameters for the encoder 13 and packetiser 16.

The receiving device 20 may also comprise bandwidth estimator 25, which may have similar functionality as bandwidth estimator 14 of the transmitting device 10. The bandwidth estimators 14 and 25 may share information (such as the measures described below) between them to determine an estimate of network bandwidth.

In a preferred example, devices 10 and 20 are participants in a VVoIP call and the media to be encoded, packetised and transmitted may be audio and/or video media data. The media stream may be comprised of two packet streams: (i) a stream for the audio data and (ii) a stream for the video data. The quality controller 15 may selectively enable or disable the streams. For example, the video stream may be disabled by causing the encoder 13 to encode audio data only. The quality controller 15 may enable/disable streams and adjust the quality of the streams so that the VVoIP can be maintained and maintained at the best possible quality. For example, if the network bandwidth is low, the quality controller 15 may disable the video stream so that the audio stream can be maintained. During a VVoIP call, priority may be given to maintaining one of the streams over the other stream (e.g. audio over video) to maintain the call.

The bandwidth estimator 14 may estimate the bandwidth of network 12 based on metrics derived from the one of the streams (audio or video). Preferably, the bandwidth is estimated based on the audio stream because the audio stream uses less bandwidth than the video stream and because the audio stream may be more essential for maintaining the call than the video stream (i.e. the audio stream may have a higher priority than the video stream. As mentioned in greater detail below, the transmission of the video stream may be adapted based on the network bandwidth estimated using the audio stream. For example, if from the audio stream, it is determined that there is low bandwidth available, the video stream may be temporally paused. When greater bandwidth availability is determined from the audio stream, the video stream may then be re-enabled. Below are some examples of how the bandwidth of the network may be estimated using the audio stream. Other methods of estimating the bandwidth of the network using packets from the audio stream may also be used.

The bandwidth estimator 14 may determine an estimate of the network bandwidth using certain parameters associated with packets of the audio stream from the transmitting device 10 to the receiving device 20. The audio stream from the receiving device 20 to the transmitting device 10 may also be used. For example, the network bandwidth may be estimated using one or a combination of the following measures:

1) Network delay. High network delay values can indicate that a larger number of packets are accumulated either in a device in the network or the device network driver. This may be, for example, because the transmitting device 10 is transmitting packets at a bitrate that is higher than the available bandwidth of the network 12 which can lead to a backlog of packets. The network delay values indicate the time taken for packets to travel from the transmitting device 10 to the receiving device 20 and/or from the receiving device 20 to the transmitting device 10.

Figure 2:
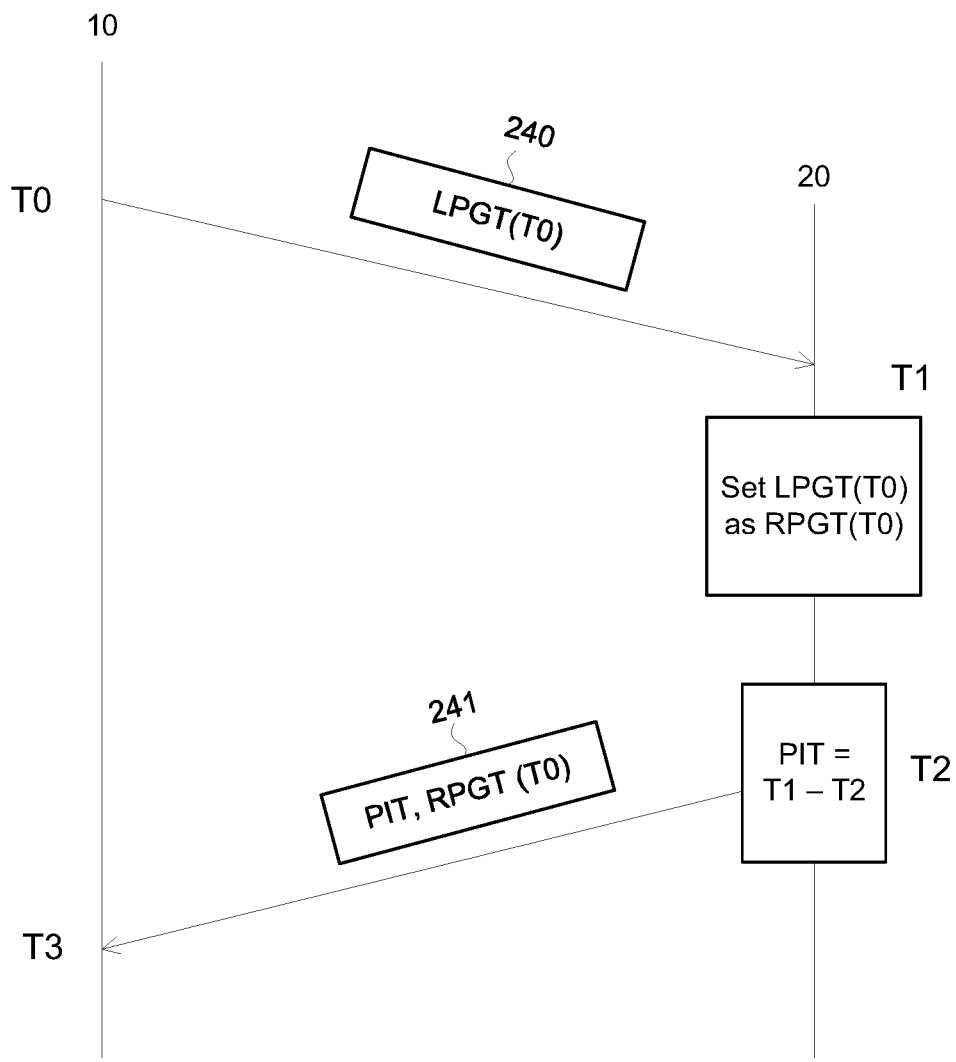
FIG. 2 depicts a process for estimating network delay.

FIG. 2 depicts one example of how network delay may be measured. Packets 240 and 241 may be packets (e.g. RTP packets) for transmitting audio between the transmitting and receiving devices 10 and 20. The packets 240 and 241 may each have one or more of the following information contained within it: Local Packet Generation Time (LPGT) and/or Remote Packet Generation Time (RPGT) and/or Packet Idle Time (PIT).

When devices 10 and 20 are communicating, for example during a VVoIP call, every audio packet transmitted for the call may incorporate the LPGT information, which for packet 240 is T0. When packet 240 is received at device 20, the time instant at reception (T1) is measured and when device 20 sends the next packet 241, the time elapsed between the time at reception of the last packet 240 and the time of transmission (T2) of the current packet 241 is incorporated into the packet 241 as the PIT (i.e. PIT=T2−T1 in the example shown in FIG. 2). The packet generation time at device 10 (i.e. T0) of the last received packet 240 is included in packet 241. Device 10 may then estimate the network delay for a round trip from the information in packet 241 as:

Network delay=packet 241 received time(*T*3)−RPGT (*T*0)−PIT(*T*2−*T*1)

Therefore, the network delay=(T1−T0)+(T3−T2), which is the time spent in transmission over the network for a round trip.

The network delay value may be influenced by factors such as the number of network gateways in the network between devices 10 and 20. The influence of these gateways to the network delay may generally be constant. To account for the delay caused by the gateways, a number of network delay measurements may be taken (e.g. between 75 and 125 and preferably around 100) and then the average of a number of minimal delay values (e.g. the four lowest values) may be determined. The determined value may provide the average round trip delay caused by the gateways in both directions. Half of this average may be used to estimate the delay caused by the gateways in a single direction (assuming that the delay is the same in both directions). Thus, for subsequently measured network delay values, the halved average may be used as a fixed value to subtract from subsequent measured network delay values to account for the delay caused by the gateways.

2) Packet reception gap. The packet reception gap may indicate when continuous streams of packets are being lost or stuck in the network. This may lead to breaks in, for example, VVoIP calls which may be dropped if the packet reception gap value is high. One way of sustaining a VVoIP call whenever the packet reception gap is high is for the transmitting device to reduce the transmission bitrate so that packets can reach the receiving device and the call can be maintained.

During an audio stream, the receiving device 20 may expect to receive packets at certain times as part of the stream. For example, a packet may contain a portion of audio that should be played back at the receiving device 20 in a certain order and/or at a certain time. The time elapsed between expecting to receive a packet and actually receiving that packet could indicate the packet reception gap.

Alternatively, the packet reception gap could be indicated by counting the number of times an audio player at the receiving device 20 (which may require audio packets at regular intervals) requests a packet for playing audio before actually receiving an audio packet. When using this method, the reception gap estimation may be enhanced to account for the effects of the variable packet size as well as the impact of lost packets having been played-out from jitter buffer. For example, if the playout requests from the audio player is every 20 ms (because, e.g., the base/default packet size expected is 20 ms) and a large packet is received that contains 100 ms of audio data, then five playout requests may still occur for the 100 ms duration, which will lead to an erroneous packet reception gap of five. A more accurate measure of the packet reception gap may be provided by dividing the number of playout requests by the packet size and multiplying the obtained value by the amount of time between playout requests (20 ms, in the example above).

The packet reception gap measure may be further enhanced by taking into account the impact of the proportion of packets that are lost. For example, the proportion of packets that are lost may be determined from the proportion of packets that are not played out from the jitter buffer over a predetermined duration (e.g. one second). The proportional value (after adding one to that value) may be multiplied by the accurate packet reception gap measure to provide an even more accurate measure of the packet reception gap.

This packet reception gap may be determined based on the type of packets that are received. For example, in some voice communication systems a silence packet (e.g. a silence descriptor (SID) packet) may be periodically sent (e.g. every 160 ms) during a silent period. Thus the silence packet may not be suitable for measuring the packet reception gap when the network conditions are rapidly changing. Thus, in some scenarios, the packet reception gap may be estimated for packets that contain audio data only.

3) Packet Loss. This measure indicates the percentage loss of packets in the network over a specified period of time.

4) Network jitter. This measure indicates the variation in the time between receiving consecutive packets. The variation may be caused by network congestion, timing drift, route changes, etc. A high value of network jitter indicates that more out-of-order packets are received.

5) Burst Loss. This measure indicates the number of packets in periods of time between the loss of a packet and the start of a continuous reception of a predetermined number of good packets.

Each of the measures 1-5 may be measured wholly or partly by the transmitting device 10 and/or the receiving device 20 based on packets of the audio stream. The transmitting device 10 may receive or derive the values for one or more of the measures 1-5 from, a network statistics report that may be compiled and sent from the receiving device 20 (e.g. by bandwidth estimator 25). The bandwidth estimate determined by bandwidth estimator 14 may utilise one of or any combination of the above measures 1 to 5. When combining the measures, each measure may be weighted differently to reflect how significantly the network bandwidth effects that measure. For example, the network bandwidth may have a more significant effect on the network delay measure than the other measures and so the network delay measure may be provided with a higher weighting. Thus appropriately weighting each measure when determining a combined measure may provide a quicker and more accurate reflection of the network bandwidth and allow the quality controller 15 to quickly adapt the transmission parameters of the media stream.

The values of each measure (or a combination of the measures) may provide an estimate of the network bandwidth. When the bandwidth of the network increases or decreases, each value (or a combination of the values) may correspondingly change to indicate the increase or decrease in the bandwidth of the network.

In a preferred example, the bandwidth estimator 14 derives a measure of the network bandwidth from the above measures 1)-5): network delay, packet reception gap, packet loss, network jitter and burst loss. This derived measure may be referred to as bandwidth factor BWF. The BWF may be based on a weighted sum of measures 1) to 5). Each of the measures may have a different weighting. One example of how each measure is weighted is shown in table 1. Other weightings are possible.

TABLE 1

| Measure ($P_i$) | Weighting Factor ($W_i$) |
|---|---|
| 1) Network Delay ($P_0$) | 0.70 |
| 2) Packet reception gap ($P_1$) | 0.10 |
| 3) Packet loss ($P_2$) | 0.05 |
| 4) Network jitter ($P_3$) | 0.10 |
| 5) Burst loss ($P_4$) | 0.05 |

The following equation is an example of how the BWF may be calculated using measures 1)-5) and the weighting factors:

$$BWF(n) = \sum_{i=0}^{k}(100\, W_i P_i(n))$$

Where n is the measurement index, k is the number of measures, $W_i$ is the weighting factor for the $i^{th}$ measure and $P_i(n)$ is the value for the $i^{th}$ measure. The BWF may be calculated in other suitable manners.

$P_i(n)$ may be a quantized value for the $i^{th}$ measure. Each measure may be quantized differently to reflect the significance of the measured value in estimating the bandwidth of the network. For example, when providing a value for the network delay, if a short delay time is measured zero quantization may be applied to the value associated with that short delay time as the bandwidth of the network is considered to be good. However, if a long delay time is measured, which indicates that the bandwidth of the network has become poor, then a large quantization may be provided to the value associated to that long delay time to provide an exaggerated impression of the poor network condition. This may allow the system to react and adapt more quickly to the degradation in the bandwidth.

The available bandwidth may be classified into distinct states depending on the measure. For example, a low BWF value (e.g. values below a first threshold) may indicate that there is a significant amount of additional bandwidth available in the network 12 to support a media stream with a higher transmission bitrate than the current media stream. The state of the network bandwidth may thus be classified as good for low BWF values. A high BWF value (e.g. values above a second threshold) may indicate that there is insufficient bandwidth in the network for the current media stream. The state of the network bandwidth may be classified as bad for high BWF values. BWF values between the high and low values (e.g. between the first and second thresholds) may indicate that the bandwidth is sufficient for the current media stream. The state of the network bandwidth may be classified as normal for such BWF values. In an example, the BWF values may range from a minimum value of 0 to maximum value of 1000. If the BWF value is less than 100, then the network may be classified as good. If the BWF value is greater than 200, then the network may be classified as bad. If the BWF value is between 100 and 200 then the network may be classified as normal. Other suitable values and ranges may be used.

Based on the state (i.e. the bandwidth) of the network, the quality controller 15 may adapt the transmission of the VVoIP stream. For example, if the network state is good, then the quality controller 15 may increase the bitrate of the VVoIP transmission. If the network state is bad, then the quality controller may decrease the bitrate of the VVoIP transmission. The quality controller 15 may not perform any adaption if the state of the network is normal.

Under a bad state, the transmission bitrate of the VVoIP may be reduced so that the state of the network is at least normal. This may be achieved by estimating the amount of bandwidth that the transmission bitrate is greater than the network bandwidth (also referred to herein as the overload bandwidth) and reducing the transmission bitrate of the VVoIP stream by the overload bandwidth. Preferably, the bandwidth of the video stream (if enabled) is reduced rather than the bandwidth of the audio stream. In one example, the overload bandwidth may be estimated from the BWF value and the current bandwidth of the video stream. The overload bandwidth may be estimated by multiplying the video bandwidth by BWF/BWF_Max, where BWF_Max is a maximum BWF value (e.g. 1000, in the example values above). The video bandwidth may then be reduced by the estimated overload bandwidth.

Under a good state, the transmission bitrate of the VVoIP may be increased by increasing the quality of the stream. For example, if the current media stream comprises an audio stream only, then the quality of the audio stream may be increased to the best available audio quality. If the network is still in a good state after the audio quality increase (i.e. the BWF is below the first threshold), then a video stream may be enabled at its lowest available quality. If the network is still in a good state, the quality of the video stream may be gradually increased until the state changes to normal or bad. As described in further detail below, the state of the network may be frequently tested and verified using probing.

Gradually increasing the transmission bitrate whilst monitoring the BWF values allows the bitrate to be increased to a level that is sufficient for the available bandwidth of the network without adversely affecting the VVoIP call. If, instead, the transmission bitrate was increased too quickly then the transmission bitrate may end up being greater than the network bandwidth before the bandwidth estimator 14 has been able to determine if the network bandwidth is sufficient for the higher transmission bitrate. Thus, the gradual increase in the transmission bitrate may be advantageous. However, gradually increasing the transmission bitrate leads is a slow process and so the device 10 may not react quickly enough to appropriately adapt to changes in the network bandwidth. Sending probe packets is one way of quickly determining how much bandwidth is available in the network, which makes it possible to quickly and appropriately adapt the VVoIP stream. A method of determining how much bandwidth is available in the network by efficiently using probe packets is discussed below.

In conventional systems, sending probe packets to test the available bandwidth involves sending probe packets that comprise junk or unwanted data. In this disclosure, however, the probe packets may be duplicate packets from the media (audio and/or video) stream. Network 12 may be lossy and so some packets from the media stream may be lost in the network 12 and never arrive at the receiving device 20. This may cause some degradation in the quality of the media to be played back at the receiving device 20. Thus, when probing, it is preferable that the probe packets are duplicate packets of packets from the media stream. The probe packets may also be forward error correction (FEC) packets for the media packets. By sending duplicate media or FEC packets, the receiving device 20 may receive data that is useful rather than data that is junk or unwanted. When the receiving device 10 receives a duplicate packet it can check if the same packet has been received previously via the media stream. If the same packet has been received previously, the duplicate packet may be discarded. If the same packet has not been received before (i.e. because it has been lost or delayed) via the media stream, then the duplicate packet is placed in the jitter buffer in place of the missing packet. Thus, by using duplicate or FEC packets as probe packets, it is possible to mitigate packet losses in network and improve the quality of the media to be played back.

The quality controller 15 may initiate the transmission of probe packets. The bandwidth estimator 14 may monitor the bandwidth of network 12 during the transmission. If there is a significant degradation in the bandwidth detected during probing, the probing may be halted. The degradation in the bandwidth indicates that the network bandwidth is sufficient for the current transmission bitrate of the media stream but there is not much additional bandwidth available to increase the transmission bitrate and so the media stream is not adapted. If there is no significant degradation in the bandwidth during probing, then the quality controller 15 may increase the quality of the media stream. This may involve increasing the quality of the audio stream or enabling the video stream if it is disabled or increasing the quality of the quality of the video stream if it is already enabled.

The transmission bitrate of the probe packets indicates how much bandwidth can be used without the significant degradation of the media stream. Thus, the transmission bitrate of the media stream can be safely increased by up to the same amount as the transmission bitrate of the probe packets without effecting the quality of the media stream. The transmission bitrate of the probe packets may itself be adapted based on the previous probes. For example, if one or more previous probes have not indicated any significant degradation in the network bandwidth, then the transmission bitrate for the probe packets may be increased, which may allow the transmission bitrate of the media stream to be increased more rapidly. If, however, the previous probe indicated a degradation in the network bandwidth, the transmission bitrate for subsequent probe transmissions may be decreased or reset to a default minimum value.

The transmission of probe packets may be carried out at regular time intervals. If, during a probe, significant degradation of the bandwidth is detected, the time to the next probe may be increased. The probing time interval for subsequent probes may be increased every time significant bandwidth degradation is detected. As sending probe packets requires network bandwidth, the quality of the media stream may be affected each time probing is performed (even though it can help mitigate packet loss). Thus by increasing the time between probing intervals when bandwidth degradation is detected, fluctuations in the quality of the media stream may be reduced.

Figure 3A:
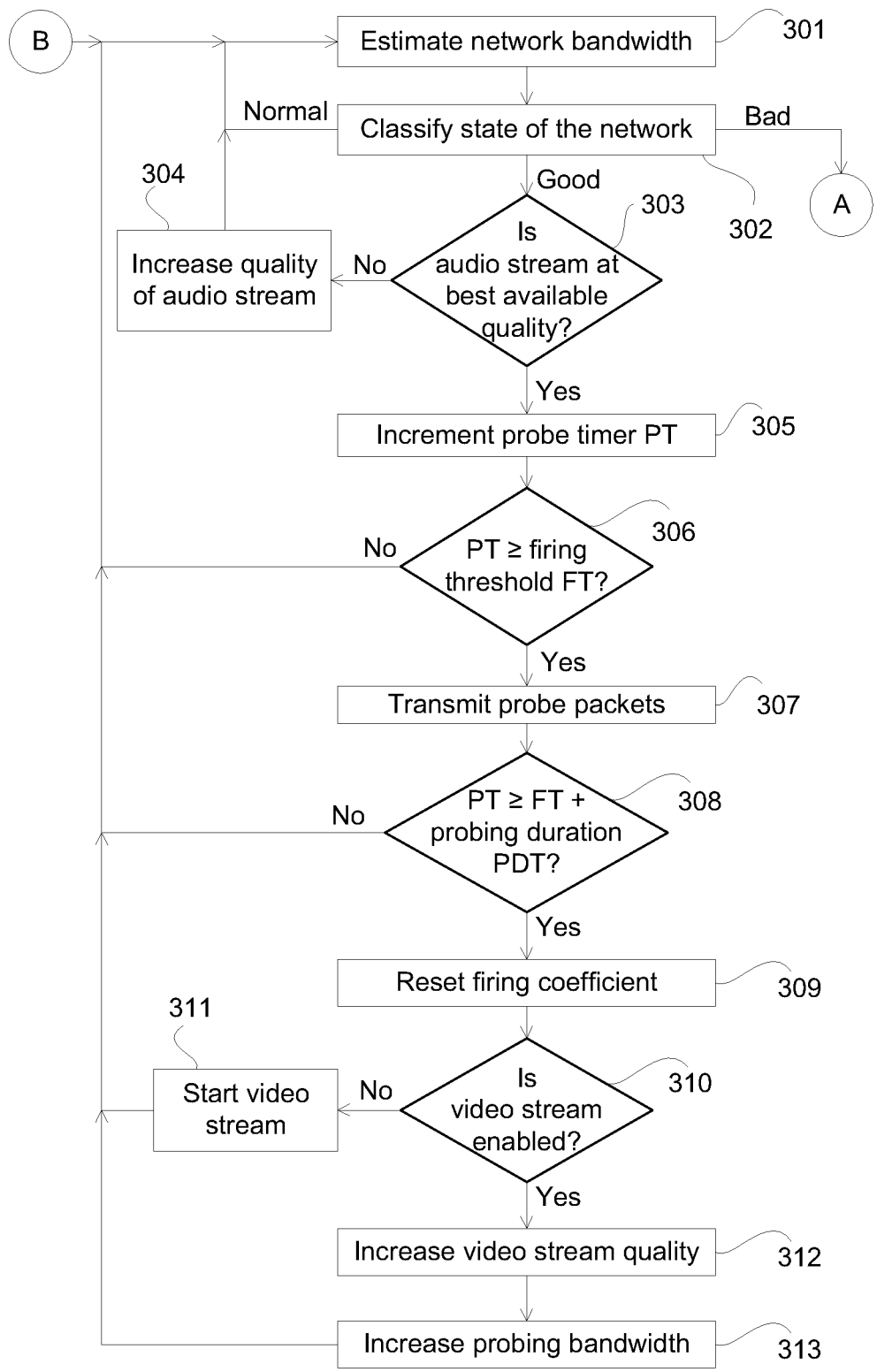
FIGS. 3a-b show an example flow chart for adapting a VVoIP stream.
Figure 3B:
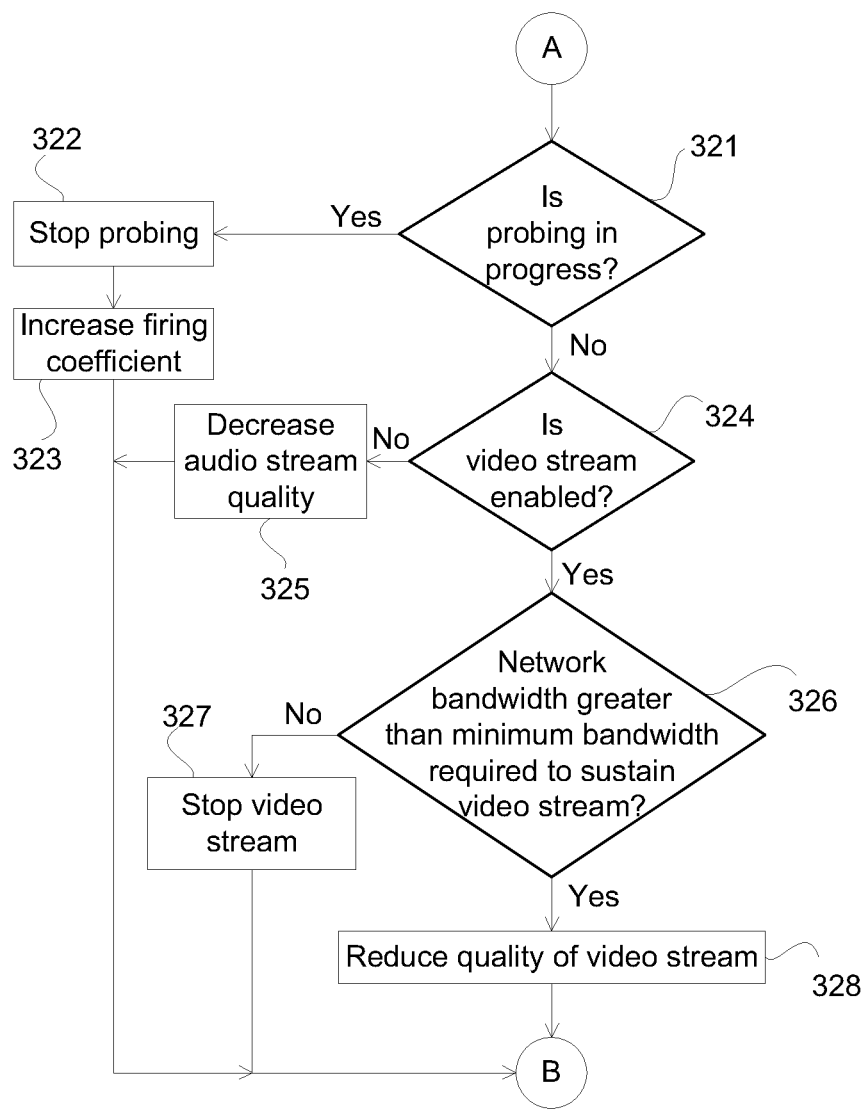

FIGS. 3*a-b* are flow diagrams detailing an example of how the media stream (comprising an audio stream and a video stream) may be adapted in response to the detected bandwidth and how probing may be utilised to adapt the bandwidth.

At step 301, the bandwidth of the network is estimated. The bandwidth may be estimated, for example, by determining the BWF (as described above). At step 302, the state of the network is classified (as described above) depending on the estimated bandwidth. If the state is classified as good, the process moves on to step 303. If the state is classified as normal, then no adaption or probing is performed and the process moves back to step 301. If the state is classified as bad, then the process moves on to step 321 of FIG. 3*b*.

At step 303, it is determined if the audio stream is adapted to the best available quality. If not, then the process moves on to step 304, where the quality of the audio stream is increased. The process then moves back to step 301. The quality of the audio may be increased gradually up to the best quality via looping of steps 301, 302, 303 and 304. Alternatively, the quality of the audio stream may be increased rapidly instead of gradually so that the quality of the audio stream is increased to the best available quality immediately or after one or two loops. If immediately after rapidly increasing the quality of the audio stream, the state of the network changes to normal or bad, then the rate of increase in the quality may be switched back to a gradual increase (this step is not shown in FIG. 3*a*).

If/when the audio stream is adapted to the best available quality, the process then moves on to step 305. When the audio stream is adapted to the best available quality, a probe timer is started (this step is not shown in the figure). When the time on the probe timer reaches a probe firing threshold FT, probing begins. The probe firing threshold FT may initially be a predetermined value that may then be adapted (as further described below).

At step 305, the probe timer PT is incremented. In this example, the probe timer PT is incremented by the amount of time that has passed since the last pass through step 305. However, the probe time could be incremented based on time (e.g. every second) or at every play request count (as described above in relation to the packet reception gap) or at any other suitable measure of time.

At step 306, the probe timer is checked to see if it has reached the probe firing threshold FT. The firing threshold FT=ηt, where t is a predetermined about of time (e.g. six seconds) and η is a firing coefficient, which may be initially set to one. If, for example, t=6s and η=1, then FT=6s and probing will being 6 seconds from when the probe timer was started or from when the last probe ended. If PT has not reached FT, then the process goes back to step 301. If PT has reached FT, then the process moves on to step 307.

At step 307, the transmission of probe packets commences or continues if it has already commenced. The probe packets are transmitted for a predetermined duration PDT (e.g. six seconds). The probe packets are transmitted at a predetermined initial bandwidth. The initial probing bandwidth BWp may be equivalent to the bandwidth required for transmitting the video stream at the lowest acceptable quality MIN_V_BW.

At step 308, it is determined if PT is greater than FT+PDT. If not, then probing is still in progress and the process moves back to step 301. If so, then probing for the predetermined duration has ended and the process moves on to step 309. If the process reaches this step, then the state of the network (see step 302) did not become bad during probe duration PDT. Thus, this indicates that the network has sufficient bandwidth for transmitting the media stream at a higher bitrate.

At step 309, the firing coefficient η is reset to its initial value (as it may have changed if the process moved to step 323 at some point, as described below).

At step 310, it is checked if the video stream is enabled. If it is not enabled, the process moves on to step 311, where the video stream is started. After starting the video stream, the process moves back to step 301. Preferably, the initial transmission bitrate of the video stream video_bw is the same as the probing bandwidth BWp. If the video stream is enabled, then the process moves on to step 312, where the quality of the video stream is increased. Preferably, the quality of the video stream in increased such the transmission bitrate video_bw increases by the same amount as the probing bandwidth BWp.

At step 313, the BWp is incremented by a predetermined bitrate value. Thus, if the network state is still good for the next bandwidth estimate, the transmission bitrate for the next probe will be higher. The BWp can be increased up to a maximum probing bandwidth, which may equivalent to the maximum transmission bitrate available for the media stream. The BWp may be increased according to:

BWp(n)=BWp(n−1)+predetermined bitrate, where n is the measurement index.

The process then returns to step 301.

FIG. 3b shows the process from step 303, where the state of the network had been classified as bad. When the network is classified as bad, the transmission bitrate for the probe packets may be reset to the minimum BWp value (this step is not shown in the figure).

At step 321, it is determined if the transmission of probe packets is currently in progress. If not, the process moves on to step 324. If so, then the process moves on to step 322, where the transmission of probe packets is halted. At step 323, the firing coefficient, n, is incremented by a predetermined value y (e.g. y=0.3). Each time the probing duration is not completed (i.e. the state of the network is classified as bad during probing), q is incremented by y. Thus, at step 323, q is set to be η(n)=η(n−1)+y, where n is the measurement index. This has the effect of increasing the intervals between the probe transmissions when the state of the network is detected as being bad during successive probe transmissions. The process then returns to step 301.

At step 324, it is determined if the video stream is enabled. If so, then the process moves on to step 326. If not, then the process moves to step 325, where the quality of the audio stream is decreased by a predetermined decremental amount so as to decrease the transmission bitrate of the audio stream. The process then moves back to step 301. The process may loop through steps 301, 302, 321, 324 and 325 to reduce the quality of the audio stream until the network condition is classified as normal or good.

At step 326, it is determined if the network bandwidth (estimated at step 301) is greater than the minimum bandwidth required to sustain the video stream at its lowest quality (MIN_V_BW) as well as the audio stream at its highest available quality. If not, then the process moves on to step 327, where the video stream is stopped. If so, then the process moves on to step 328, where the quality of the video stream is reduced by the difference in the current the transmission bitrate of the audio and video streams and the determined network bandwidth. For example, the bandwidth of the video stream may be reduced by an estimated overload bandwidth, as described above. The process moves back to step 301 after steps 327 and 328.

As described above, the bandwidth is preferably estimated using measures (such as the BWF) that are derived the transmission of the media stream. When the media stream comprises an audio stream only (i.e. the video stream is off), the bandwidth is estimated using the packets sent as part of the audio stream. This estimated bandwidth is then used to determine if the video stream should be enabled (i.e. the transmission bitrate of the video stream should be increased from zero). Thus, it is possible to determine from packets that are already being sent on an audio stream if the network bandwidth will be suitable for also sending a video stream. There is, therefore, no need to send separate or additional packets for determining if the bandwidth of the network is suitable for supporting a video steam. Therefore, the bandwidth of the network is more efficiently utilised.

The availability of network bandwidth may also be determined by sending probe packets, which may comprise media data or FEC data or may be duplicates of packets that have already been sent. This provides more efficient way of utilising the bandwidth for probing (rather than sending probe packets with junk data) as the data within the probe packets may be useful to the receiving device. Thus, compared with sending probe packets with junk data, the quality of the media played back at the receiving device may be greater by sending probe packets with duplicate or FEC data.

The devices of FIG. 1 are shown as comprising a number of functional blocks. This is schematic only and is not intended to define a strict division between different logic elements of such entities. Each functional block may be provided in any suitable manner.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods.

Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

Code defining an integrated circuit may define an integrated circuit in any manner, including as a netlist, code for configuring a programmable chip, and as a hardware description language defining an integrated circuit at any level, including as register transfer level (RTL) code, as high-level circuit representations such as Verilog or VHDL, and as low-level circuit representations such as OASIS and GDSII. When processed at a suitably equipped computer system configured for generating a manifestation of an integrated circuit, code defining an integrated circuit may cause the computer system to generate a manifestation of the integrated circuit expressed by the code. Such computer systems may cause a manifestation of an integrated circuit to be generated by, for example, providing an output for controlling a machine configured to fabricate an integrated circuit or to fabricate an intermediate expression of the integrated circuit, such as a lithographic mask.

Higher level representations which logically define an integrated circuit (such as RTL) may be processed at a computer system configured for generating a manifestation of an integrated circuit in the context of a software environment comprising definitions of circuit elements and rules for combining those elements in order to generate the manifestation of an integrated circuit so defined by the representation.

As is typically the case with software executing at a computer system so as to define a machine, one or more intermediate user steps (e.g. providing commands, variables etc.) may be required in order for a computer system configured for generating a manifestation of an integrated circuit to execute code defining an integrated circuit so as to generate a manifestation of that integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of estimating available bandwidth for a network comprising a transmitting device and a receiving device, the method comprising:
   transmitting a media packet stream over the network to the receiving device, the media packets comprising media data for streaming media at the receiving device;
   transmitting one or more probe packets over the network so as to test the available bandwidth of the network, wherein each probe packet comprises duplicate media data of the media packet stream;
   determining, during transmission of the one or more probe packets, a measure of network bandwidth availability in dependence on one or more metrics associated with receiving the media packet stream at the receiving device; and
   receiving the one or more probe packets and using the media data in at least some of the received one or more probe packets for playing media at the receiving device.

2. The method as claimed in claim 1, wherein each of the one or more probe packets is a duplicate of a media packet from the media packet stream.

3. The method as claimed in claim 2, further comprising determining whether the probe packet is a duplicate packet of a media packet that has been received prior to receiving the probe packet and, if not, placing the probe packet in a jitter buffer and using the media data from the probe packet in the jitter buffer for playing media at the receiving device.

4. The method as claimed in claim 1, further comprising, if the measure indicates a reduction in the available bandwidth sufficient to degrade the quality of the media stream, stopping the transmission of the probe packets.

5. The method as claimed in claim 1, further comprising, if the measure indicates sufficient available bandwidth, increasing a transmission bitrate for the media stream.

6. The method as claimed in claim 5, wherein said increase of the transmission bitrate comprises enabling a video stream.

7. The method as claimed in claim 1, wherein the probe packets are transmitted at regular time intervals, wherein, if the measure indicates a reduction in the bandwidth of the network sufficient to degrade the quality of the media stream, increasing the amount of time between the time intervals.

8. A transmitting device for estimating available bandwidth for a network comprising the transmitting device and a receiving device, the transmitting device comprising:
   a transceiver configured to transmit a media packet stream over the network to the receiving device, the media packets comprising media data for streaming media at the receiving device;
   a controller configured to cause the transceiver to transmit one or more probe packets over the network so as to test the available bandwidth of the network, wherein each probe packet comprises duplicate media data of the media packet stream; and
   a bandwidth estimator configured to determine, during transmission of the one or more probe packets, a measure of network bandwidth availability in dependence on one or more metrics associated with receiving the media packet stream at the receiving device; and the receiving device comprising:

a transceiver configured to receive the one or more probe packets;

a media consumer configured to use the media data in at least some of the received one or more probe packets for playing media.

9. The device as claimed in claim 8, wherein the one or more probe packets are duplicates of packets from the media packet stream.

10. The device as claimed in claim 8, wherein the controller is configured to stop the transmission of the probe packets if during transmission of the probe packets the measure indicates a reduction in the available bandwidth sufficient to degrade the quality of the media stream.

11. The device as claimed in claim 8, wherein the controller is configured to increase a transmission bitrate for the media stream if during transmission of the probe packets the measure indicates sufficient available bandwidth.

12. The device as claimed in claim 11, wherein said increase of the transmission bitrate comprises enabling a video stream.

13. The device as claimed in claim 8, wherein the probe packets are transmitted at regular time intervals and the controller is configured to increase the amount of time between the time intervals if during transmission of the probe packets the measure indicates a reduction in the bandwidth of the network sufficient to degrade the quality of the media stream.

14. A device as claimed in claim 8, wherein the receiving device further comprises a jitter buffer and the receiving device is configured to, for each received probe packet: determine whether the probe packet is a duplicate packet of a media packet that has been received prior to receiving the probe packet and, if not, place the probe packet in the jitter buffer and use the media data from the probe packets in the jitter buffer for playing media at the media consumer.

15. A non-transitory computer readable storage medium having stored thereon computer readable instructions that, when executed at a computer system, cause the computer system to perform a method of estimating available bandwidth for a network comprising a transmitting device and a receiving device, the method comprising:

transmitting a media packet stream over the network to the receiving device, the media packets comprising media data for streaming media at the receiving device;

transmitting one or more probe packets over the network so as to test the available bandwidth of the network, wherein each probe packet comprises duplicate media data of the media packet stream; and determining, during transmission of the one or more probe packets, a measure of network bandwidth availability in dependence on one or more metrics associated with receiving the media packet stream at the receiving device; and receiving the one or more probe packets and using the media data in at least some of the received one or more probe packets for playing media at the receiving device.

\* \* \* \* \*

UNITED STATES PATENT AND TRADEMARK OFFICE
CERTIFICATE OF CORRECTION

PATENT NO.        : 11,570,115 B2
APPLICATION NO.   : 15/249653
DATED             : January 31, 2023
INVENTOR(S)       : Senthil Kumar Mani and Bala Manikya Prasad Puram It is certified that error appears in the above-identified patent and that said Letters Patent is hereby corrected as shown below:

In the Specification

Column 13, Line 61:
"the firing coefficient n is incremented . . ."
Should be:
-- the firing coefficient η is incremented . . . --

Column 13, Lines 64-65:
"q is incremented by y. Thus at step 323, q is set to be η (n) = η (n-1) + y, where n is the measurement index."
Should be:
-- η is incremented by y. Thus at step 323, η is set to be η (n) = η (n-1) + y, where n is the measurement index. --

Signed and Sealed this
Twentieth Day of June, 2023

Katherine Kelly Vidal
*Director of the United States Patent and Trademark Office*